United States Patent
Kim et al.

(10) Patent No.: US 11,006,335 B2
(45) Date of Patent: May 11, 2021

(54) METHOD FOR SETTING AND CONTROLLING CARRIER FOR DIRECT DEVICE-TO-DEVICE COMMUNICATION IN WIRELESS COMMUNICATION SYSTEM, AND DEVICE THEREFOR

(71) Applicant: LG ELECTRONICS INC., Seoul (KR)

(72) Inventors: Heejin Kim, Seoul (KR); Seungmin Lee, Seoul (KR); Hanbyul Seo, Seoul (KR); Hyukjin Chae, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 16/494,745

(22) PCT Filed: Mar. 16, 2018

(86) PCT No.: PCT/KR2018/003088
§ 371 (c)(1),
(2) Date: Sep. 16, 2019

(87) PCT Pub. No.: WO2018/169342
PCT Pub. Date: Sep. 20, 2018

(65) Prior Publication Data
US 2020/0107234 A1    Apr. 2, 2020

Related U.S. Application Data

(60) Provisional application No. 62/472,593, filed on Mar. 17, 2017, provisional application No. 62/474,629, filed on Mar. 22, 2017.

(51) Int. Cl.
*H04W 36/00* (2009.01)
*H04L 5/00* (2006.01)
*H04W 72/04* (2009.01)

(52) U.S. Cl.
CPC ......... *H04W 36/03* (2018.08); *H04L 5/0037* (2013.01); *H04W 36/0069* (2018.08);
(Continued)

(58) Field of Classification Search
CPC ............ H04W 36/03; H04W 36/0069; H04W 72/0413; H04W 72/044; H04W 72/048;
(Continued)

(56) References Cited

U.S. PATENT DOCUMENTS

| | | |
|---|---|---|
| 2015/0327240 A1 | 11/2015 | Yamada et al. |
| 2016/0073408 A1 | 3/2016 | Sartori et al. |
| 2018/0242302 A1* | 8/2018 | Lee ............... H04L 5/0094 |

FOREIGN PATENT DOCUMENTS

WO    2017034324    3/2017

OTHER PUBLICATIONS

PCT International Application No. PCT/KR2018/003088, Written Opinion of the International Searching Authority dated Jul. 13, 2018, 19 pages.
(Continued)

*Primary Examiner* — Walter J Divito
(74) *Attorney, Agent, or Firm* — Lee Hong Degerman Kang Waimey

(57) ABSTRACT

The present application discloses a method for transmitting a signal by a transmission terminal using direct device-to-device communication in a multicarrier communication system. Specifically, the method comprises the steps of: transmitting first data and first control information for the first data to a reception terminal via a first carrier; and transmitting second data and second control information for the second data to the reception terminal via a second carrier, wherein the first control information includes multicarrier-related information indicating at least one among an indicator indicating whether transmission is multicarrier trans-
(Continued)

mission via the first carrier and the second carrier, an identifier of the transmission terminal, and an indicator indicating whether transmission timing of the first carrier and transmission timing of the second carrier coincide.

6 Claims, 9 Drawing Sheets

(52) U.S. Cl.
CPC ....... *H04W 72/044* (2013.01); *H04W 72/048* (2013.01); *H04W 72/0413* (2013.01)

(58) Field of Classification Search
CPC ...... H04W 72/04; H04L 5/0037; H04L 5/001; H04L 27/2601; H04L 5/0048; H04L 5/0053; H04L 5/003; H04L 5/0094
See application file for complete search history.

(56) References Cited

OTHER PUBLICATIONS

LG Electronics, "Discussion on scheduling assignment for PC5-based V2V", 3GPP TSG RAN WG1 Meeting #84, R1-160637, Feb. 2016, 5 pages.

3rd Generation Partnership Project (3GPP), "Technical Specification Group Radio Access Network; Study on LTE-based V2X Services; (Release 14)," 3GPP TR 36.885 V14.0.0, Jun. 2016, 218 pages.

* cited by examiner

-- Prior Art --

FIG. 2
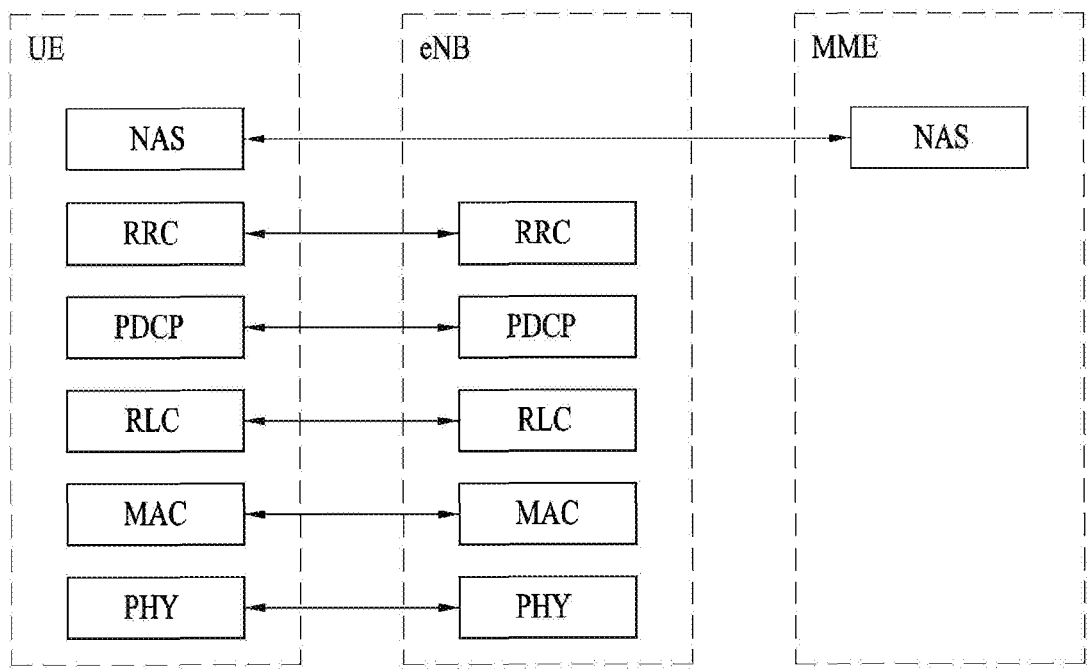
(a) Control - Plane Protocol Stack
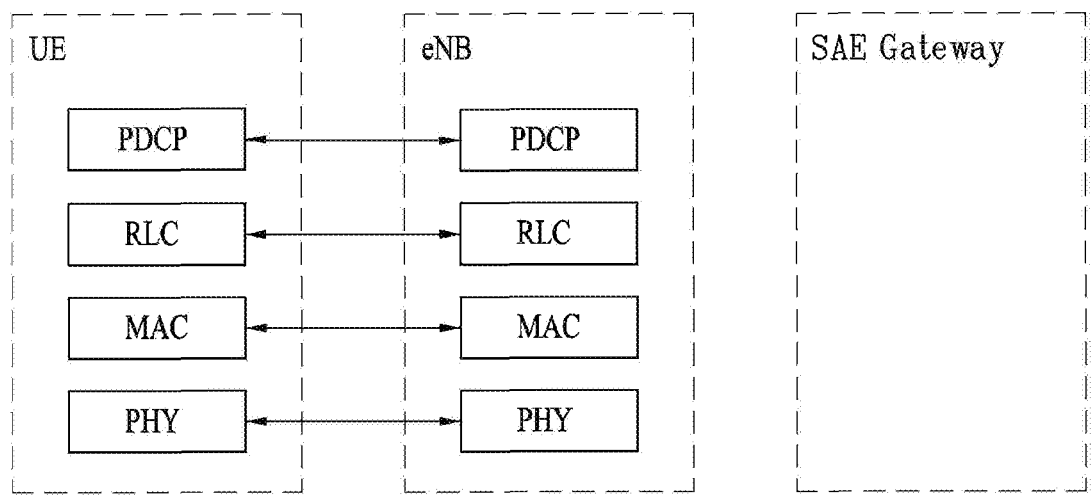
(b) User - Plane Protocol Stack

METHOD FOR SETTING AND CONTROLLING CARRIER FOR DIRECT DEVICE-TO-DEVICE COMMUNICATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/003088, filed on Mar. 16, 2018, which claims the benefit of U.S. Provisional Application No. 62/472,593, filed on Mar. 17, 2017, and 62/474,629, filed on Mar. 22, 2017, the contents of which are all hereby incorporated by reference herein in their entirety.

TECHNICAL FIELD

The present invention relates to a wireless communication system and, more particularly, to a method of configuring and controlling a carrier for device-to-device direct communication in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

As more communication devices have demanded higher communication capacity, there has been necessity of enhanced radio broadband communication relative to legacy Radio Access Technology (RAT). In addition, massive Machine Type Communication (MTC) for providing various services anytime and anywhere by connecting a plurality of devices and objects to each other is also one main issue to be considered in next-generation communication. Further, a communication system to be designed in consideration of services/UEs sensitive to reliability and latency is under discussion. Thus, introduction of next-generation RAT has been discussed by taking into consideration such matters. In the present invention, the above technology is referred to as NewRAT (NR) for convenience of description.

DETAILED DESCRIPTION OF THE INVENTION

Technical Problems

Based on the above-described discussion, a method of configuring and controlling a carrier for device-to-device direct communication in a wireless communication system and an apparatus therefor will be proposed hereinbelow.

Technical Solutions

According to an aspect of the present invention, provided herein is a method of transmitting a signal using a Device-to-Device (D2D) direct communication by a transmission User Equipment (UE) in a multi-carrier communication system, including transmitting first data and first control information for the first data to a reception UE through a first carrier; and transmitting second data and second control information for the second data to the reception UE through a second carrier, wherein the first control information includes multi-carrier related information representing at least one of an indicator indicating whether multi-carrier transmission through the first carrier and the second carrier is performed, an identifier of the transmission UE, or an indicator indicating whether transmission timings of the first carrier and the second carrier are equal.

In another aspect of the present invention, provided herein is a method of receiving a signal using a Device-to-Device (D2D) direct communication by a reception User Equipment (UE) in a multi-carrier communication system, including receiving first data and first control information for the first data from a transmission UE through a first carrier; and receiving second data and second control information for the second data from the transmission UE through a second carrier, wherein the first control information includes multi-carrier related information representing at least one of an indicator indicating whether multi-carrier transmission through the first carrier and the second carrier is performed, an identifier of the transmission UE, or an indicator indicating whether transmission timings of the first carrier and the second carrier are matched.

The multi-carrier related information may be allocated to reserved bits of control information for D2D direct communication through a single carrier.

The first control information may include resource allocation information corresponding to the first data and the second control information may include resource allocation information corresponding to the second data. If the second carrier is reselected or transmission is performed only through the first carrier, the first control information may include a release indicator of the resource allocation information included in the second control information or the resource allocation information included in the second control information may be set to 0.

Advantageous Effects

According to an embodiment of the present invention, transmission beam control and reception beam control for device-to-device direct communication may be more efficiently performed.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

BEST MODE FOR CARRYING OUT THE INVENTION

Figure 1:
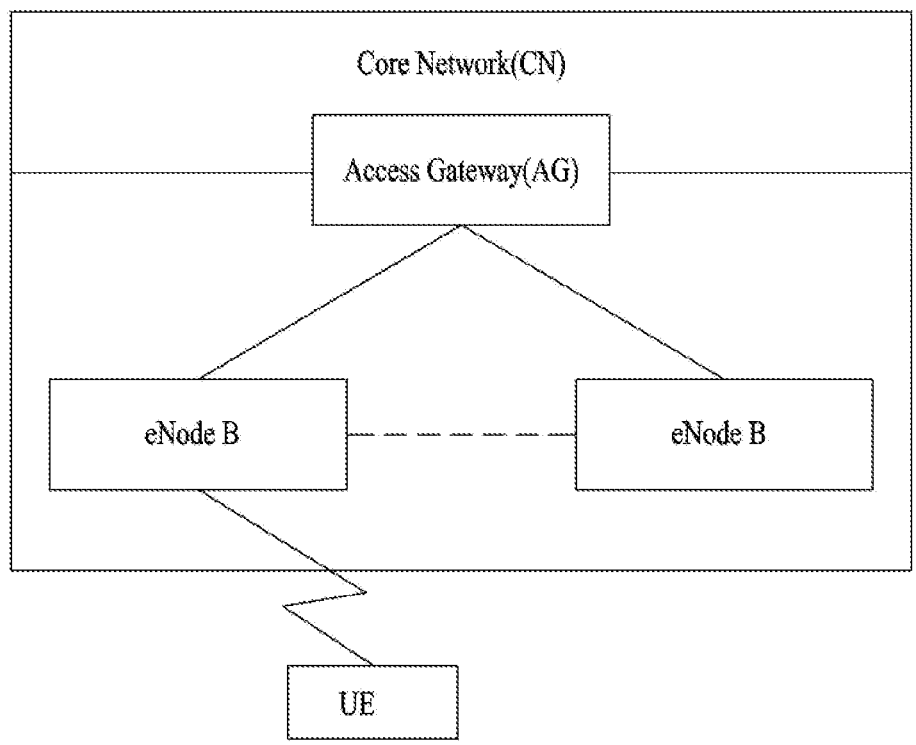
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
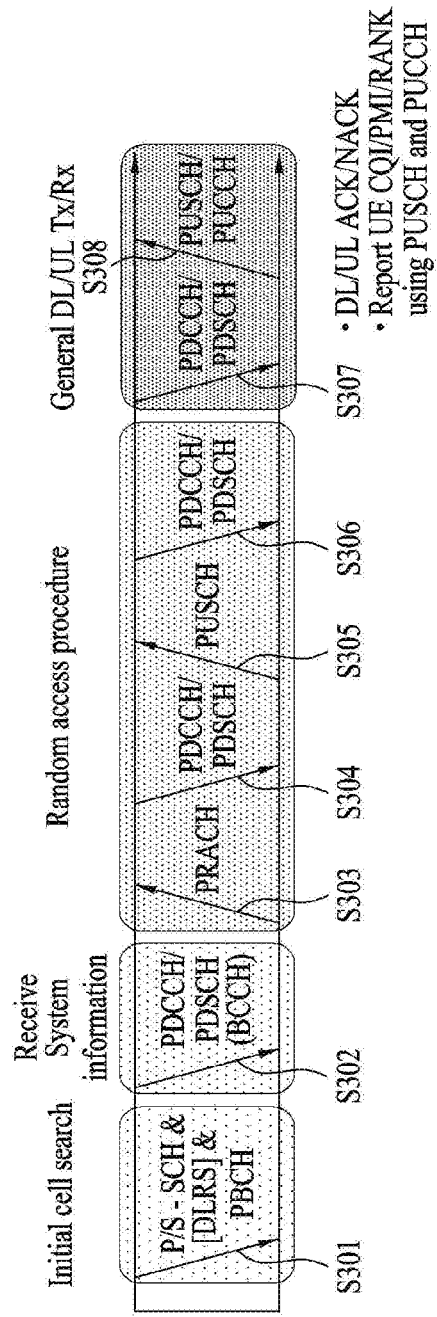
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
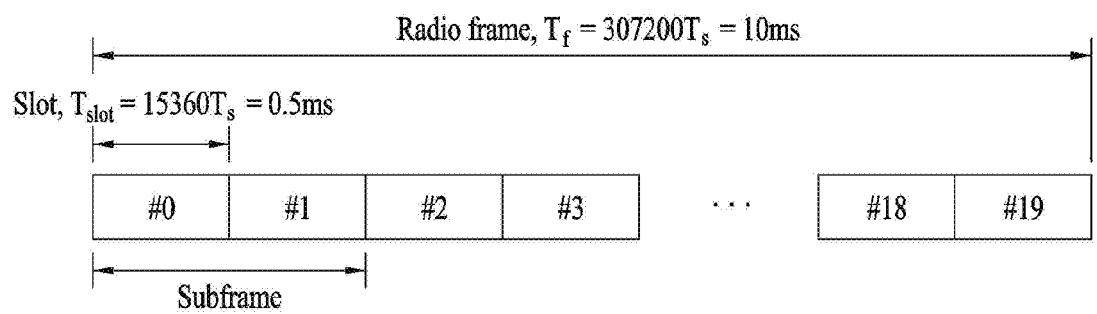
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10−8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
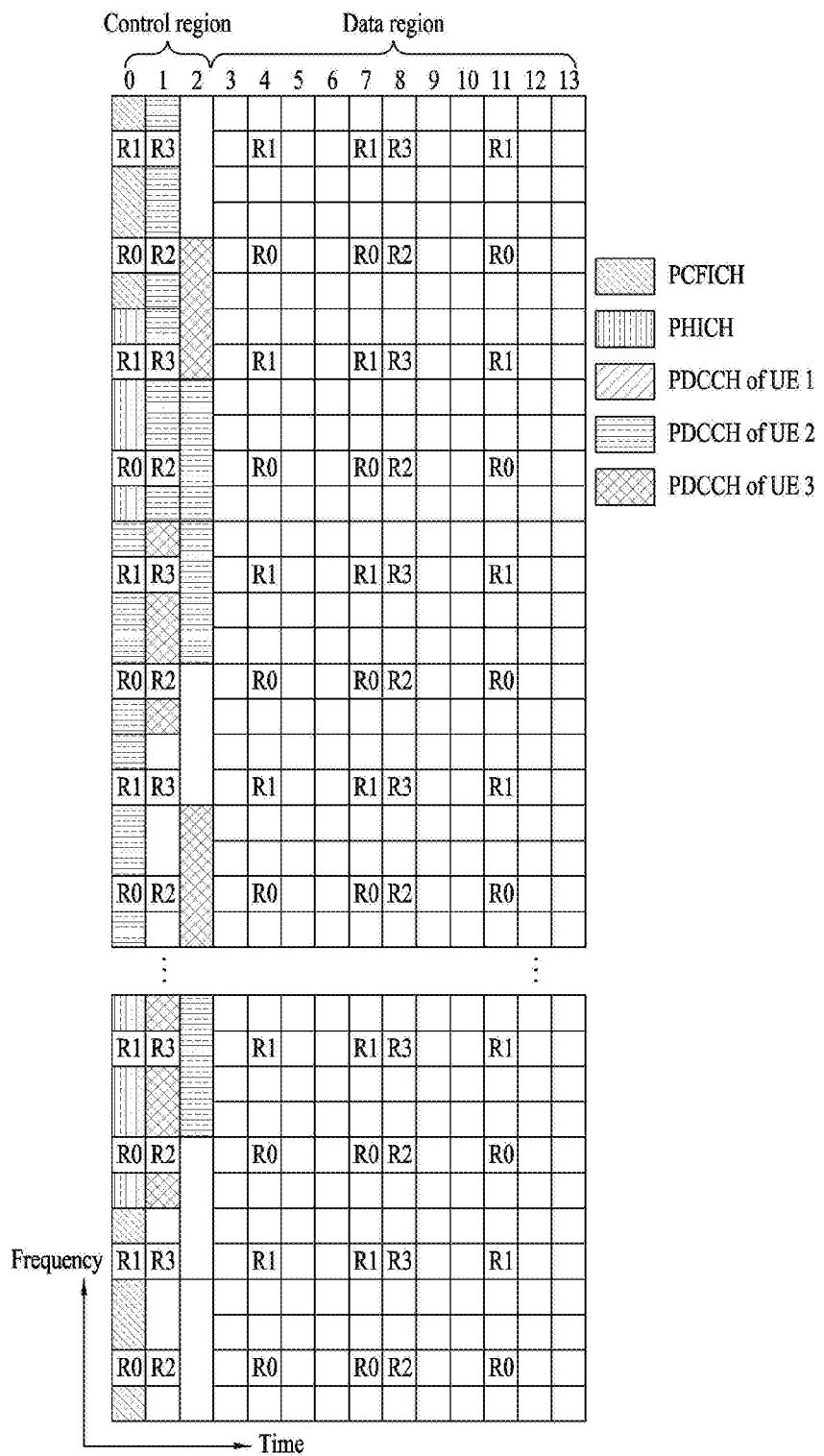
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
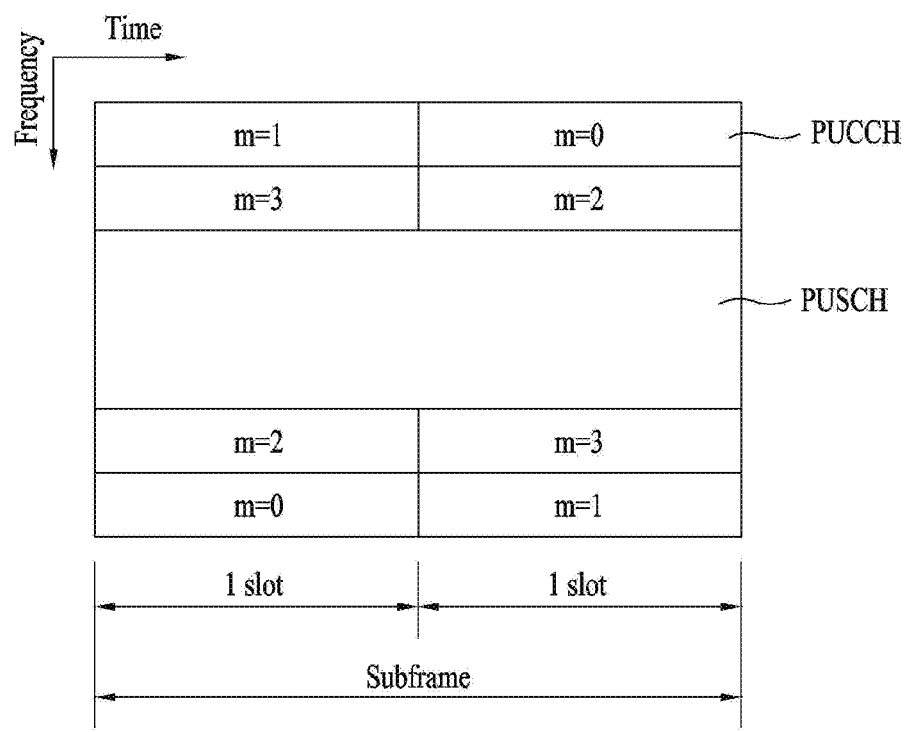
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
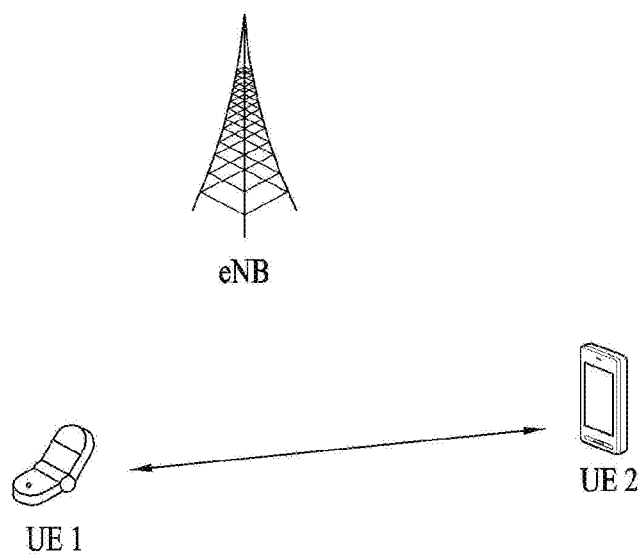
FIG. 7 is a diagram illustrating the concept of device-to-device (D2D) communication.

FIG. 7 is a diagram illustrating the concept of device-to-device (D2D) communication.

Referring to FIG. 7, in D2D communication in which a UE performs direct wireless communication with another UE, i.e., in a D2D direct communication, an eNB may transmit a scheduling message for indicating transmission and reception of a D2D link signal. Hereinafter, a link for D2D direct communication, directly connected between UEs, i.e., a D2D link, is referred to as a sidelink (SL) as a concept compared with UL and DL.

The UE participating in sidelink communication may receive a sidelink scheduling message from the eNB, and performs Tx/Rx operations indicated by the sidelink scheduling message. Here, although a UE means a user terminal, a network entity such as an eNB may be regarded as a UE when transmitting and receiving a signal according to a communication method between UEs. In addition, the eNB may receive a sidelink signal transmitted by the UE and a signal transmission and reception method of the UE designed for sidelink transmission may be applied to an operation of transmitting a UL signal to the eNB by the UE.

In order to perform sidelink operation, a UE performs a discovery procedure of determining whether a counterpart UE of sidelink communication is located in a sidelink communication area. Such a discovery procedure includes transmitting a unique discovery signal for identifying each UE and determining that the UE, which has transmitted the discovery signal, is located at a neighboring position when a neighboring UE detects the discovery signal. That is, each UE determines whether a counterpart UE of sidelink communication is located at a neighboring position via the discovery procedure and then performs sidelink communication for transmitting and receiving user data.

Meanwhile, the case in which UE1 selects a resource unit corresponding to specific resources in a resource pool indicating a set of resources and transmits a sidelink signal using the corresponding resource unit will be described hereinbelow. Herein, the resource pool may be indicated to UE1 by an eNB when UE1 is positioned within coverage of an eNB and the resource pool may be indicated to UE1 by another UE or predetermined when UE1 is positioned out of coverage of the eNB. Generally, the resource pool consists of a plurality of resource units and each UE may select one or plural resource units to use the resource units to transmit a sidelink signal thereof.

Figure 8:
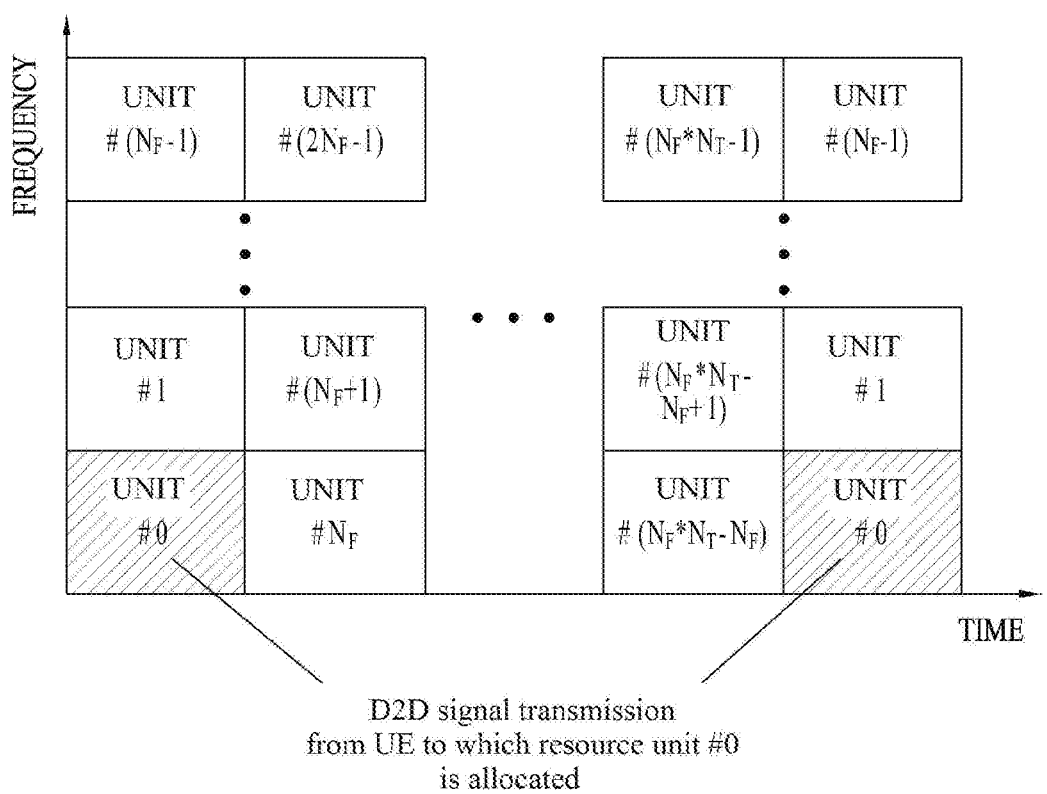
FIG. 8 illustrates an exemplary configuration of a resource pool and a resource unit.

FIG. 8 illustrates an exemplary configuration of a resource pool and a resource unit.

Referring to FIG. 8, all frequency resources are divided into NF frequency resources and all time resources are divided into NT time resources, thereby defining a total of (NF*NT) resource units. Particularly, a resource pool is repeated at a period of NT subframes. Characteristically, one resource unit may repeatedly appear in a periodic form. Alternatively, in order to gain a diversity effect in the time or frequency domain, an index of a physical resource unit to which one logical resource unit is mapped may be changed over time according to a predetermined pattern. In this resource unit structure, the resource pool may mean a set of resource units that can be used for transmission by a UE that desires to transmit a sidelink signal.

The aforementioned resource pool may be subdivided into a plurality of types. First, the resource pool may be divided according to content of a sidelink signal transmitted in the resource pool. For example, as in 1) to 3) below, the content of the sidelink signal may be classified into SA, a sidelink data channel, and a discovery signal and separate resource pools may be set according to respective contents.

1) Scheduling assignment (SA): The SA may refer to a signal including positional information of resource that is used for transmission of a subsequent sidelink data channel by a transmission UE and information on a modulation and coding scheme (MCS) for demodulation of a D2D data channel or a MIMO transmission method. It may also be possible to multiplex and transmit the SA along with sidelink data on the same resource unit and, in this case, the SA resource pool may refer to a pool of resource in which the SA is multiplexed and transmitted along with sidelink data.

2) Sidelink data channel: The sidelink data channel may refer to a channel that is used to transmit user data by a transmission UE. When the SA is multiplexed and transmitted along with the sidelink data on the same resource unit, a resource element (RE) used to transmit SA information on a specific resource unit of the SA resource pool may be used to transmit the sidelink data even in a sidelink data channel resource pool.

3) Discovery signal: The discovery signal may refer to a resource pool for a signal for allowing a transmission UE to transmit information such as an ID of the transmission UE and a neighboring UE to discover the transmission UE.

4) Synchronization signal: The synchronization signal may refer to a resource pool for a signal/channel for allowing a reception UE to achieve the purpose of acquiring time/frequency synchronization with a transmission UE by allowing a transmission UE to transmit the synchronization signal and information related to synchronization.

Among Vehicle-to-Everything (V2X) use cases, there may be a use case in which data transmission requiring high data rate such as sensor data sharing or infotainment is needed. In this case, a data transmission scheme through a single carrier, which is currently under consideration, may have difficulty in satisfying a target data rate demanded in the corresponding use case. As a solution to this problem, applying a Carrier Aggregation (CA) scheme for performing large-capacity data transmission through a plurality of carriers to a V2X communication environment may be considered.

First Embodiment

In the first embodiment of the present invention, a method of selecting a plurality of Component Carrier (CCs) to be used for transmission when a CA scheme is applied to V2X communication is proposed. A scenario that may consider the CA scheme in order to improve a data rate in V2X communication may be broadly categorized into two cases according to a mapping scheme between a carrier and data, as described below.

1) First, single/plural data transmission unit(s) (e.g., Transport Block (TB) of LTE) may be mapped to a plurality of carriers for transmission.

Specifically, if a single data transmission unit (e.g., a TB of an LTE system) is transmitted through different carriers, this implies that the single transmission unit such as the TB in the LTE system may be segmented and then mapped to a plurality of carriers for transmission.

In the scenario in which the plural data transmission units are transmitted through plural different carriers, each data transmission unit may be segmented into different data for a single service and configured by data units which can be independently decoded. More specifically, a criterion of segmentation of each data transmission unit may be determined depending on whether each data transmission unit is an essential element of data content. That is, this means that configuration of plural data transmission units for a single service is divided into essential data which is indispensable for minimum support of the service and supplementary data which is needed to improve quality of service (e.g., picture quality/sound quality/sensing sensitivity) although there is no problem for minimum support of a service if reception fails or is impossible, so that the essential data and the supplementary data may be respectively transmitted through different plural carriers.

As an example of segmenting the data transmission unit according to whether the data is an essential element, a frame type of MPEG coding and a frame structure of DBM may be considered. More specifically, the frame type of MPEG coding includes three frames I, P, and B having characteristics described below.

I frame—The I frame refers to an infra frame. Simply speaking, the I frame is a key frame with a whole picture which is compressed directly from a source like a JPEG type. The I frame has the best quality but requires large capacity.

P frame—The P frame refers to a previous or predicted frame as a frame configured based on information of the previous key frame and has a middle level of the I frame and a B frame which is to be described below in quality and capacity.

B frame—The B frame refers to a bidirectional frame configured based on information of preceding and following I/P frames. The B frame has the lowest quality and requires the lowest capacity.

In MPEG-1/2 encoding, the B and P frames depend on other frames, unlike the I frame. Therefore, if there is great variation in the B and P frames and a current frame, picture quality is correspondingly lowered. However, if the key frame is inserted whenever a scene requiring high resolution, for example, a scene with many movements, is changed, enhancement in picture quality may be obtained although capacity is increased. If description is given according to whether the frame type in MPEG coding of the above example is mapped to an essential element of the data content, the I frame may be regarded as the essential data and the B and P frames may be regarded as the supplementary data.

2) Next, a method of mapping the same or almost similar V2X message to a plurality of carriers may be considered.

Since a channel situation such as a Channel Busy Ratio (CBR) differs according to each carrier, even when the same data is transmitted, data reception performance may differ according to through which carrier the data is transmitted. Therefore, the transmission UE may transmit the same data through a plurality of different carriers and the reception UE may combine data transmitted through the carriers, thereby improving data rate performance Specifically, the transmission UE may transmit data by differently setting a Redundancy Version (RV) for a data transmission unit per carrier and the reception UE may combine the data during data decoding, thereby improving performance.

In the above situation, a method of distinguishing between layers of carriers for CA-based V2X message transmission and configuring a candidate carrier set for carrier selection will be described below. In the present invention, carrier #X may be interpreted as:

(A) a carrier for which UEs performing V2X communication basically (or commonly) includes a receiver chain (and/or a transmitter chain), (B) a carrier configured (or signaled) to support predefined(/preset) basic (public) safety service (at a specific location or in a specific area/country), (C) a carrier through which minimum control information (e.g., a Physical Sidelink Control Channel (PSCCH) or V2X pool configuration information) related to a V2X message, essential information related to V2X communication, a V2X message having a preset (or signaled) priority threshold value or more, and/or system information (e.g., a candidate carrier set) related to V2X communication is transmitted during CA-based V2X message transmission, (D) a carrier having the highest priority or a priority of a predetermined threshold value or more in terms of power allocation during CA-based V2X message transmission, and/or (E) a carrier through which a synchronization signal is transmitted.

In the present specification, in CA-based V2X message transmission, carriers that do not satisfy the above-described conditions for carrier #X (i.e., carriers except for carrier #X) are collectively referred to as carrier #Y. Carrier #X and carrier #Y described in the present specification may be regarded as the terms a Primary CC (P-CC) and a Secondary CC (S-CC), respectively, in LTE CA.

Hereinafter, when a UE (or eNB) selects a plurality of carriers for CA-based transmission, methods a) and b) of forming a candidate set (or candidate pool) for selecting the carriers will be described. In this case, the plural carriers may correspond to carrier #X and/or carrier #Y which corresponds to one or more carriers.

a) A dedicated carrier candidate set (i.e., a reserved carrier set) for CA transmission is separately configured (or signaled) in advance and the transmission UE (or eNB) may necessarily select carrier #Y from reserved carriers during CA-based data transmission.

That is, one or some reserved carriers may be previously designated and a CBR for these carriers may be maintained to always have a (prescheduled) threshold value or less. The transmission UE may necessarily select, during data transmission through CA, carrier #Y from the reserved carriers (or frequencies). In more detail, in order to maintain the CBR for the reserved carriers at a specific threshold value or less, a single UE should also maintain a Channel occupancy Ratio (CR) at a preset (or signaled) specific threshold value or less. In this case, a transmission UE may be configured to always monitor the predesignated reserved carriers.

b) The eNB may previously designate and indicate a candidate carrier set for CA transmission so as to select carrier #Y from the set.

The eNB may previously designate an index of a carrier to be used for initial transmission in an out-of-coverage area through higher-layer signaling such as RRC signaling for the UE and/or a candidate carrier set (i.e., carrier index(es) for performing sensing) for carrier #Y for the UE.

In the out-of-coverage area, the transmission UE may regard the carrier to be used for predesignated initial transmission as carrier #X and perform basic data transmission. The transmission UE may select some carrier(s) among carriers of the candidate carrier set, based on sensing for the candidate carrier set perdesignated by the eNB to perform sensing and use the selected carrier(s) as carrier #Y for CA. For example, the carrier to be used for initial transmission designated by the eNB may be determined based on information about the location of the UE.

Even if the transmission UE is in an in-coverage environment, the eNB may dynamically or statically signal the candidate carrier set capable of being used by the UE for CA, thereby reducing the number of candidate carriers that a reception UE should monitor for CA-based data transmission. In this case, the candidate carrier set for CA transmission, previously configured or signaled by the eNB, may be recognized by each UE as a reception carrier to be used for data reception.

Hereinafter, a method of selecting a carrier for CA scheme (corresponding to a CC in LTE CA) will be described.

The transmission UE (or eNB) may select a plurality of carriers to be used for CA from among candidate carriers, in overall consideration of a CBR, received signal quality, data transmission periodicity, latency requirement, and/or data priority. In this case, the plural carriers may correspond to carrier #X and/or carrier #Y.

A criterion for selecting the carriers may be applied at a time with the same priority in an overall way or may be sequentially applied with different priorities. As an example, when the carriers are selected by considering the received signal power as a first priority and the CBR as a second priority, the best carriers according to the respective criteria may differ. In this case, for data transmission when the data transmission periodicity is short or the latency requirement is tight, it may be efficient for the UE to select carriers having a low CBR although the received signal power is slightly low, in terms of improvement in entire resource efficiency. Therefore, the UE may map a specific probability value to the data transmission periodicity and/or the latency requirement value and select one of the best carrier based on the received signal power with the probability value and the best carrier based on the CBR. That is, the probability value may be preset to select a carrier having a low CBR with a higher probability as the data transmission periodicity is short or low-latency transmission is needed.

The criterion for selecting the carriers may be equally applied even to determination as to whether to transmit arbitrary data through carrier #X or other carrier #Y while CA-based transmission is performed. That is, a carrier (i.e., carrier #X) through which a packet of a priority higher than a preset (or signaled) threshold value may be previously configured (or signaled).

The above-described method of selecting carriers for CA-based transmission may be summarized as a method in which the UE operates to select a specific carrier based on a given channel environment (e.g., CBR, received signal quality, data priority, and performance requirement). Unlike this case, it may be possible to differently configure (or signal) a carrier (resource or frequency) environment having a possibility of allocating data in consideration of the data priority and/or performance requirement. That is, a packet (L_PKT) having a lower priority than a preset (or signaled) threshold on the same carrier (e.g., carrier #X) may configure or signal physical layer parameters, which are independent of or different from a packet (H_PKT) having a higher priority than the threshold, and a CR limit value CR_LIMIT. The physical layer parameters may include, for example, RB size, maximum transmission power, and retransmission or non-retransmission.

As an example, in the same CBR measurement environment, L_PKT related CR_LIMIT may be set to be low relative to H_PKT related CR_LIMIT and an L_PKT related maximum transmission power may be set to be low relative to an H_PKT related maximum transmission power. Unlike H_PKT related retransmission, L_PKT related retransmission may not be permitted.

If a CBR value of carrier #X is above a preset (or signaled) allowable value, a method of transmitting L_PKT on preconfigured (or signaled) carrier #Y rather than carrier #X may be considered. For example, carrier #Y may be configured (or signaled) by a plurality of carriers. In this case, the UE may be caused to preferentially select/use a carrier having a relatively low CBR measurement value (or a carrier permitting high CR_LIMIT) or select/use a carrier according to a preconfigured priority for carrier selection. If CR_LIMIT is differently configured per carrier, the transmission UE may select a carrier thereof in order of a big difference between CR_LIMIT and a currently measured CBR value.

When CA-based data transmission is performed, power spectral density is reduced by using transmission power which is divided on a plurality of carriers and this means performance degradation in terms of coverage. Therefore, the UE may determine, based on measurement, whether to select data rate performance although there is performance loss in terms of coverage or perform an operation for guaranteeing performance in terms of coverage by giving up improvement in data rate. Alternatively, the UE may determine whether to apply CA in consideration of a trade-off between coverage extension and data rate boosting according to preconfigured (or signaled) criterion.

As an example, in a situation in which a CBR of carrier #X is high, if CBRs of some or all carriers of carrier #Y are lower than a threshold value, the transmission UE selects the carriers as transmission carriers and performs CA-based data transmission through the selected carriers. If there is no carrier satisfying the above condition out of carrier #Y, the transmission UE may drop CA-based data transmission and adopt a transmission strategy for securing coverage through data transmission on a single carrier.

Second Embodiment

To minimize an impact of CA-based transmission on legacy V2X and cellular operations upon supporting CA-based transmission, a sensing operation for carriers may be independently performed on each carrier as in a legacy operation and a method in which the transmission UE informs the reception UE of information as to whether a CA scheme is applied and information about carrier #Y may be the most reasonable and efficient solution.

First, a method of signaling whether the CA scheme is applied and signaling parameters related to CA-based transmission will now be described.

The transmission UE may cause the reception UE to identify information about an indication as to whether the CA scheme is applied to data transmitted thereby, information about the number/indexes of aggregated carriers, information about a transmission UE ID, information as to whether CA-based transmission timings for carriers are matched, information about the position of a PSCCH of an aggregated carrier (i.e., a starting point of a resource), and/or information as to whether cross-carrier scheduling is applied.

The transmission UE ID may be used by the reception UE to identify, during data decoding and combining, that data is transmitted by the same transmission UE. If the transmission UE indicates the position of a PSCCH of an aggregated carrier through carrier #X, the reception UE may operate to understand the indicated PSCCH and a Physical Sidelink Shared Channel (PSSCH) as V2X transmitted through carrier #Y during CA-based transmission together with data of carrier #X.

The above-described information may be transmitted through the following containers described below in i) to iii) on carrier #X and/or carrier #Y.

i) Method of Using Reserved Bits of a Legacy Sidelink Control Information (SCI)

The transmission UE may use 7 bits corresponding to the reserved bits of the SCI to transmit 1 bit as an indicator indicating whether the CA scheme is applied and/or the number/indexes of aggregated carriers. This means that single-carrier data transmission for legacy UEs is supported and, at the same time, information as to whether CA-based transmission is performed and information about an aggregated carrier are transmitted through the reserved bits to UEs having CA capabilities.

ii) Method of Defining New SCI Format

Definition of an SCI format to which the information as to whether the CA scheme is applied, the information about the number of aggregated carriers, and/or the information about the transmission UE ID is added as a new field may be considered by increasing the payload size of the SCI.

iii) Piggybacking Method on PSSCH

Since a payload in the SCI format is limited, a method of piggybacking the above information on a PSSCH resource and transmitting the piggybacked information together with data may be an alternative method. Particularly, upon combining duplicated data transmitted through a plurality of carriers, the reception UE needs to identify from which transmission UE corresponding CA-based data is transmitted by performing SA and data decoding.

However, since available reserved bits of a legacy SCI format are only 7 bits, it may be difficult to transmit UE-ID related information on a PSCCH resource. In this case, transmitting the UE-ID related information on a PSSCH resource may be an efficient transmission method. While only UE-ID transmission has been described, it is possible to transmit an indicator indicating whether CA is applied and/or information about an aggregated carrier through the PSSCH according to a payload restriction condition.

In addition to i) to iii) described above, a transmission method through a Media Access Control (MAC) Control Element (CE) of the PSSCH may be considered. Although the above-proposed methods may be independently implemented, the proposed methods may be implemented in a combined (or integrated) manner of a part of the proposed methods.

If a carrier on which a synchronization signal is transmitted is defined as carrier #X, (A) information, included in carrier #X and/or carrier #Y, as to whether a CA scheme is applied may be interpreted as implicitly meaning that transmission through carrier #Y is synchronized with carrier #X or (B) a field representing the information may be regarded as a parameter related to CA-based transmission and may indicate the field using the above-described containers.

Hereinafter, resource allocation and resource reservation methods for CA-based transmission will be described.

Resource allocation for CA-based transmission may broadly consider two cases: cross-carrier scheduling and non-cross carrier scheduling.

Non-cross-carrier scheduling will now be described first.

To minimize an impact of resource allocation for CA-based transmission on an existing operation, a method supporting a CA operation may be considered in which resource sensing, allocation, and reservation operations for aggregated carriers are independently performed as in existing operations but the transmission UE selects a carrier and then informs the reception UE of information about whether a CA scheme is applied or information about aggregated carrier(s). In this case, it is necessary to differently consider a resource reservation configuration method on each carrier according to a periodicity of CA-based transmission.

First, during one-shot transmission based on non-cross-carrier scheduling, if CA-based transmission (for all periodic data transmission) is always performed even for data transmission requiring a high data rate, this may be an inefficient solution in terms of overall resource management. Therefore, the UE may perform only CA-based one-shot transmission (without resource reservation) through a plurality of selected carriers in consideration of a CBR and then operate to perform one-shot transmission again by temporarily occupying a resource at a timing at which it is determined that CA-based transmission is proper. Upon performing resource allocation for carrier #Y for CA-based transmission, the transmission UE may release a resource after one-shot transmission by setting a resource reservation field value to 0 by default so that resource reservation is not performed through each SCI of carrier #Y.

Second, during periodic transmission based on non-cross-carrier scheduling, the transmission UE may basically perform sensing and reservation operations for carriers in an independent manner. However, (A) if it is determined that CA transmission is not necessary any more, (B) if it is determined that carriers need to be reselected, or (C) if it is determined that periodic resource reservation is an inefficient environment (based on measurement), the transmission UE may indicate termination of CA-based transmission through SA transmission on carrier #A and/or release of a reserved resource for carrier #Y (e.g., set the resource reservation field value to 0).

Next, cross-carrier scheduling will be described.

To simplify a CA-based transmission operation, resource allocation and/or reservation of carrier #Y corresponding to carriers aggregated based on cross-carrier scheduling may be indicated through carrier #X. In this case, control information including information about resource allocation/reservation of carrier #Y may be configured (A) to be individually configured through the SCI of carrier #X or (B) to inherit control information of carrier #X. A more detailed method is described below.

First, during one-shot transmission based on cross-carrier scheduling, the transmission UE may release a resource after CA-based one-shot data transmission (A) by setting field values of individual carriers by default (e.g., resource reservation field values of respective carriers are set to 0) so that resource reservation for carriers aggregated through the SCI of carrier #X may not be performed. This method serves explicitly indicate corresponding information through the SCI of carrier #X. Alternatively, the transmission UE may release (B) a resource after CA-based one-shot data transmission by including only a single resource reservation value in a field in the SCI of carrier #X, regarding a corresponding field value as a resource reservation field of carrier #X, and configuring a resource reservation field value of other carrier #Y to be implicitly recognized as 0 when cross-carrier scheduling is configured.

Next, during periodic transmission based on cross-carrier scheduling, the transmission UE may perform resource allocation by indicating carrier #Y using a Carrier Indication Field (CIF) in legacy LTE through an SCI format of carrier #X as described above or mapping a CIF bit to a reserved bit of a legacy SCI format and indicating a resource location for carrier #Y which are aggregated carriers. For example, a 1-bit or 2-bit subframe offset is configured as a corresponding indicator and the reception UE is configured to directly perform SCI decoding on a corresponding carrier, so that decoding complexity may be reduced and unnecessary field inheritance for different subchannel size configurations may be prevented.

In addition, during CA-based V2X message transmission under the assumption that cross-carrier scheduling is applied, all or a part of control information of aggregated carries scheduled by carrier #X may be previously configured/signal so as to be inherited from control information of carrier #X so that an SCI payload of carrier #Y for cross-carrier scheduling may be reduced.

For example, in CA transmission based on cross-carrier scheduling, resource selection, reselection, and/or reservation for aggregated carriers scheduled by carrier #X may operate in association with resource selection, reselection, and/or reservation for V2X message transmission through carrier #X. Specifically, if resource reselection is performed on carrier #X, a method may be considered in which resource reselection is simultaneously performed on all aggregated carriers scheduled by carrier #X. That is, resource selection, reselection, and/or reservation of aggregated carriers may be interpreted as depending on resource selection, reselection, and/or reservation of carrier #X.

Alternatively, a method may also be considered in which carrier #X is defined as a control carrier for resource selection, reselection, and/or reservation and an indication of triggering, termination, and/or change for resource selection, reselection, and/or reservation of carrier #X and aggregated carriers scheduled by carrier #X is given only by carrier #X. That is, a triggering/termination/change request for resource selection, reselection, and/or reservation for carrier #Y may not be additionally configured (signaled) or, even if the request is configured, a triggering/termination/change request through carrier #X may be prioritized or may replace a function of the request for carrier #Y.

In addition, measurement values for carrier #X and aggregated carriers scheduled by carrier #X may be configured as a representative value (e.g., an average value or a weighted average) of values measured on the plural carriers. For example, CR and/or CBR values of carrier #X and aggregated carriers scheduled by carrier #X may be configured as a weighted average value of measurement values on the plural carriers.

Although the above-described proposed methods may be independently implemented, the proposed methods may be implemented in a combined (or integrated) manner of a part of the proposed methods. While proposed technology has been described based on V2X communication, the proposed technology is applicable to all V2X scenarios including Vehicle-to-Infrastructure (V2I)/Vehicle-to-Network (V2N) and Vehicle-to-Pedestrian (V2P).

Figure 9:
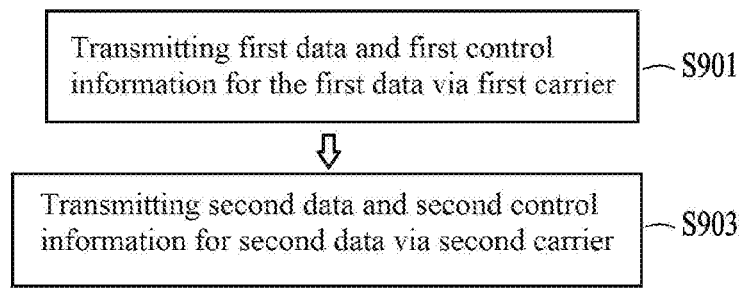
FIG. 9 is a flowchart illustrating a method of transmitting control information and data through a Carrier Aggregation (CA) scheme according to an embodiment of the present invention.

FIG. 9 is a flowchart illustrating a method of transmitting control information and data through a CA scheme according to an embodiment of the present invention.

Referring to FIG. 9, a transmission UE transmits first data and first control information for the first data to a reception UE through a first carrier in step 901. In step 903, the transmission UE transmits second data and second control information for the second data to the reception UE through a second carrier. Step 901 and step 903 may be performed sequentially or simultaneously.

Particularly, in step 901, the first control information may include information related to multiple carriers, indicating at least one of an indicator indicating whether transmission corresponds to multi-carrier transmission through the first carrier and the second carrier, an identifier of the transmission UE, or an indicator indicating whether transmission timings of the first carrier and the second carrier are matched. The information related to multiple carriers may be allocated to reserved bits of control information for D2D direct communication through a single carrier, thereby minimizing an impact on legacy UEs.

Additionally, the first control information includes resource allocation information corresponding to the first data and the second control information includes resource allocation information corresponding to the second data. That is, cross-carrier scheduling is not supported. In this case, if the second carrier is reselected or transmission is performed only through the first carrier, the first control information may include a release indicator of the resource allocation information included in the second control information, or the resource allocation information included in the second control information may be set to 0.

Figure 10:
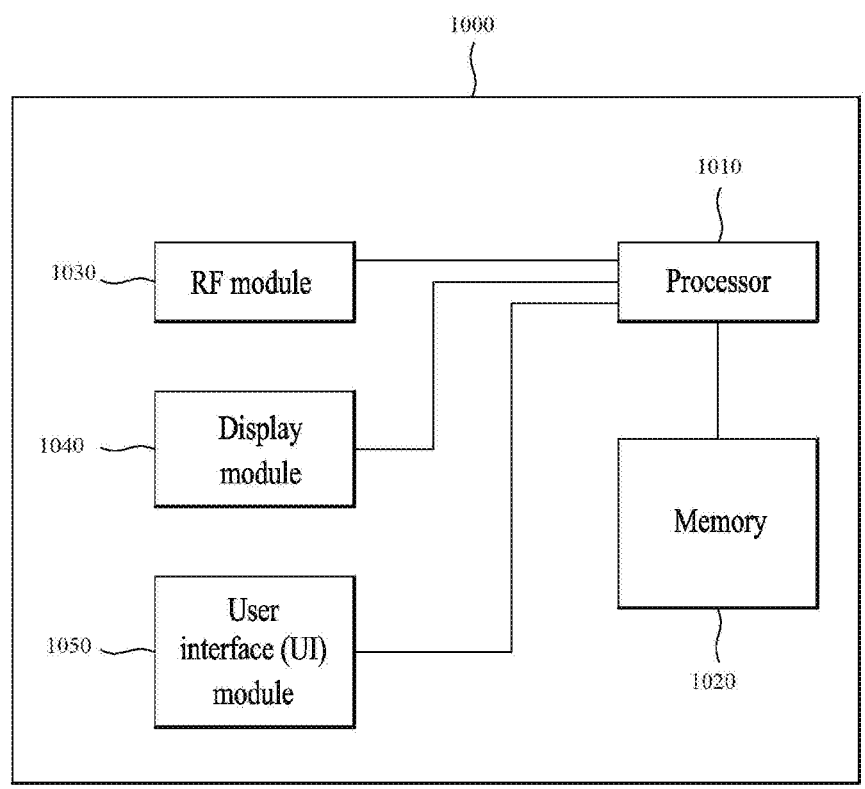
FIG. 10 is a block diagram of a communication apparatus according to an embodiment of the present invention.

FIG. 10 is a block diagram illustrating a communication device according to embodiments of the present invention.

In FIG. 10, the communication device 1000 includes a processor 1010, a memory 1020, a Radio Frequency (RF) module 1030, a display module 1040, and a user interface (UI) module 1050.

The communication device 1000 is disclosed for illustrative purposes only and certain modules may also be omitted from the communication device 1000 as necessary. In addition, the communication device 1000 may further include necessary modules. Some modules of the communication device 1000 may be identified as more detailed modules.

The processor 1010 is configured to carry out the operations of the embodiments of the present invention. For detailed operations of the processor 1010 reference may be made to FIGS. 1 to 9.

The memory 1020 is connected to the processor 1010, and stores an operating system, applications, program code, data and the like. The RF module 1030 is connected to the processor 1010 and converts a baseband signal into a radio frequency (RF) signal, or converts the RF signal into the baseband signal. For these operations, the RF module 1030 performs analog conversion, amplification, filtering, and frequency up-conversion in order or performs such operations in reverse order. The display module 1040 is connected to the processor 1010 and displays a variety of information. The scope or spirit of the display module 1040 of the present invention is not limited thereto, and the display module 1040 may be any of well-known elements, for example, a Liquid Crystal Display (LCD), a Light Emitting Diode (LED), an Organic Light Emitting Diode (OLED) and the like. The user interface (UI) module 1050 is connected to the processor 1010, and may be implemented as a combination of user interfaces such as a keypad, a touchscreen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

What is claimed is:

1. A method of transmitting a signal using a Device-to-Device (D2D) direct communication by a transmission User Equipment (UE) in a multi-carrier communication system, the method comprising:
   transmitting first data and first control information for the first data to a reception UE through a first carrier; and
   transmitting second data and second control information for the second data to the reception UE through a second carrier,
   wherein the first control information includes multi-carrier related information representing at least one of an indicator indicating whether multi-carrier transmission through the first carrier and the second carrier is performed, an identifier of the transmission UE, or an indicator indicating whether transmission timings of the first carrier and the second carrier are matched,
   wherein the first control information includes resource allocation information corresponding to the first data and the second control information includes resource allocation information corresponding to the second data, and
   wherein, if the second carrier is reselected or transmission is performed only through the first carrier, the first control information includes a release indicator of the resource allocation information included in the second control information.

2. The method of claim 1, wherein the multi-carrier related information is allocated to reserved bits of control information for D2D direct communication through a single carrier.

3. The method of claim 1, wherein, if the second carrier is reselected or transmission is performed only through the first carrier, the resource allocation information included in the second control information is set to 0.

4. A method of receiving a signal using a Device-to-Device (D2D) direct communication by a reception User Equipment (UE) in a multi-carrier communication system, the method comprising:
   receiving first data and first control information for the first data from a transmission UE through a first carrier; and
   receiving second data and second control information for the second data from the transmission UE through a second carrier,
   wherein the first control information includes multi-carrier related information representing at least one of an indicator indicating whether multi-carrier transmission through the first carrier and the second carrier is performed, an identifier of the transmission UE, or an indicator indicating whether transmission timings of the first carrier and the second carrier are matched,
   wherein the first control information includes resource allocation information corresponding to the first data and the second control information includes resource allocation information corresponding to the second data, and
   wherein, if the second carrier is reselected or transmission is performed only through the first carrier, the first control information includes a release indicator of the resource allocation information included in the second control information.

5. The method of claim 4, wherein the multi-carrier related information is allocated to reserved bits of control information for D2D direct communication through a single carrier.

6. The method of claim 4, wherein, if the second carrier is reselected or transmission is performed only through the first carrier, the resource allocation information included in the second control information is set to 0.

* * * * *